United States Patent [19]

Hamatani

[11] Patent Number: 5,789,897
[45] Date of Patent: Aug. 4, 1998

[54] COMPONENT FOR MOTOR START UP CIRCUIT

[75] Inventor: Junichi Hamatani, Shiga, Japan

[73] Assignee: Murata Manufacturing Co., Ltd., Kyoto, Japan

[21] Appl. No.: 845,271

[22] Filed: Apr. 24, 1997

[30] Foreign Application Priority Data

Apr. 25, 1996 [JP] Japan ................... 8-104976

[51] Int. Cl.$^6$ ........................................ H02P 1/42
[52] U.S. Cl. ...................... 318/783; 318/788; 318/795
[58] Field of Search ........................... 318/727, 767, 318/778, 781, 782, 783, 785, 786, 788, 791, 792, 794, 795

[56] References Cited

U.S. PATENT DOCUMENTS

| | | |
|---|---|---|
| 3,708,720 | 1/1973 | Whitney et al. |
| 3,829,010 | 8/1974 | Jones . |
| 4,574,229 | 3/1986 | Kim . |

FOREIGN PATENT DOCUMENTS

| | | |
|---|---|---|
| 0034979 | 2/1981 | European Pat. Off. |
| 0294118 | 5/1988 | European Pat. Off. |
| 0571956 | 5/1993 | European Pat. Off. |
| 6339291 | 2/1994 | Japan . |

Primary Examiner—Bentsu Ro
Attorney, Agent, or Firm—Keiichi Nishimura

[57] ABSTRACT

A motor-driving circuit includes an auxiliary coil which functions at the time of the start-up of the motor and a main coil for its stead state operation. A component of a start-up circuit to be incorporated in such a motor-driving circuit includes a thermistor with positive temperature characteristic and a Triac switch which are to be connected in series with the auxiliary coil, a case which contains both the thermistor and the Triac switch, and a connector member having a planar contact portion, one of its principal surfaces contacting an electrode of the thermistor and the other of the principal surfaces contacting the inner wall surface of the case. The case may further contain therein another thermistor connected to the gate of the Triac switch for controlling the Triac switch.

20 Claims, 4 Drawing Sheets

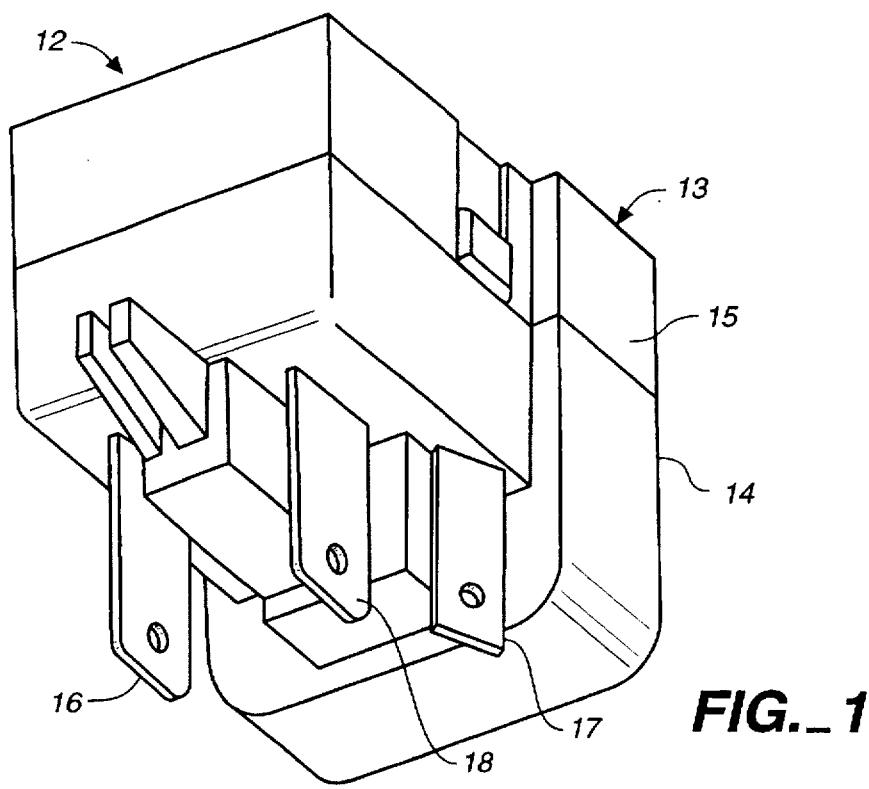
FIG._1
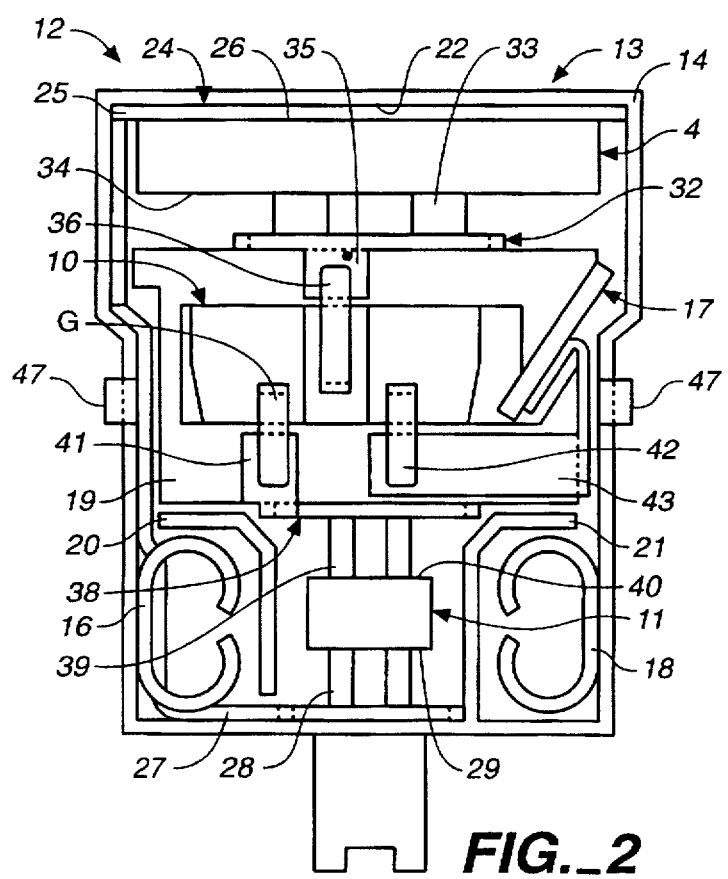
FIG._2

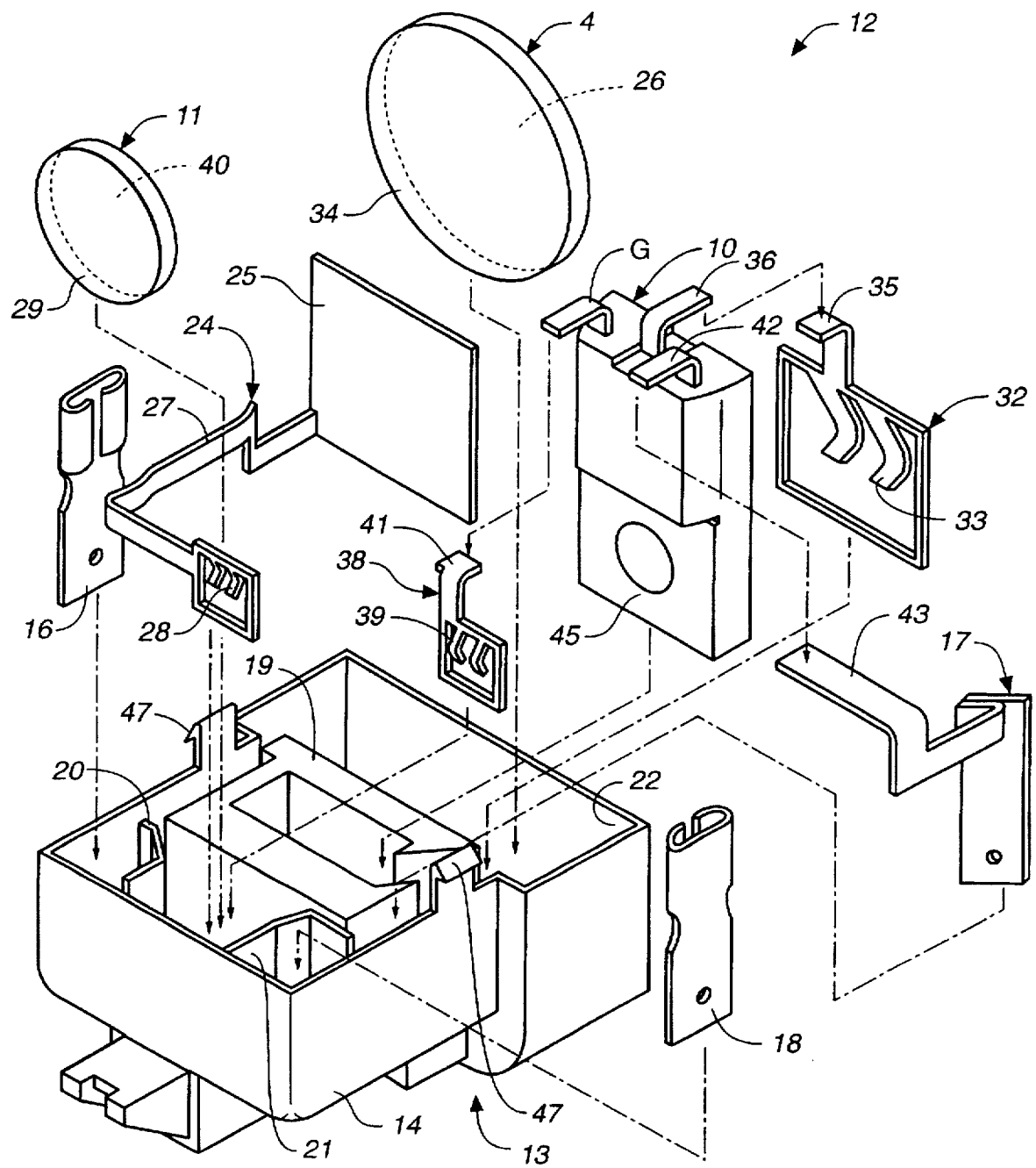
FIG._3

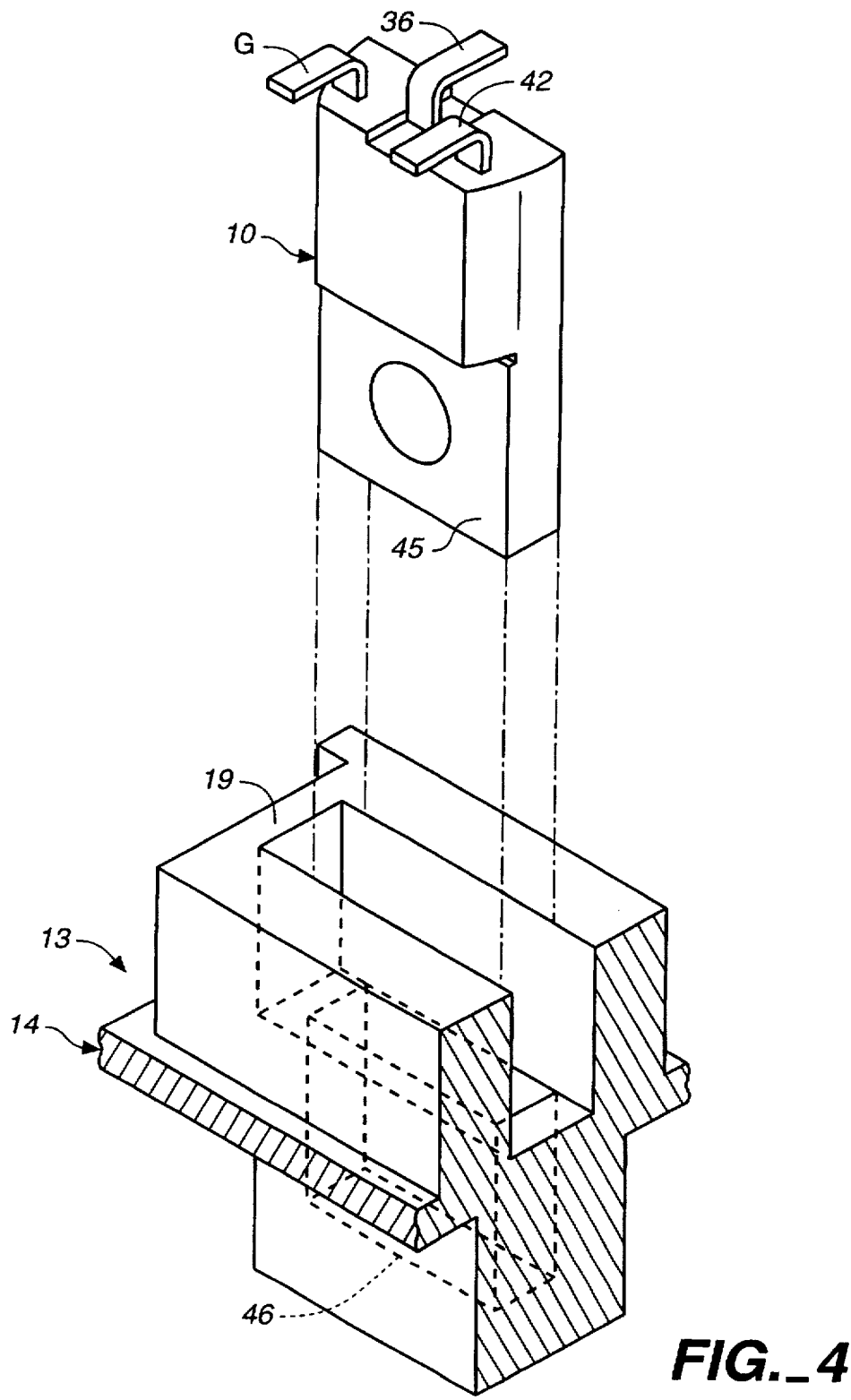
FIG._4

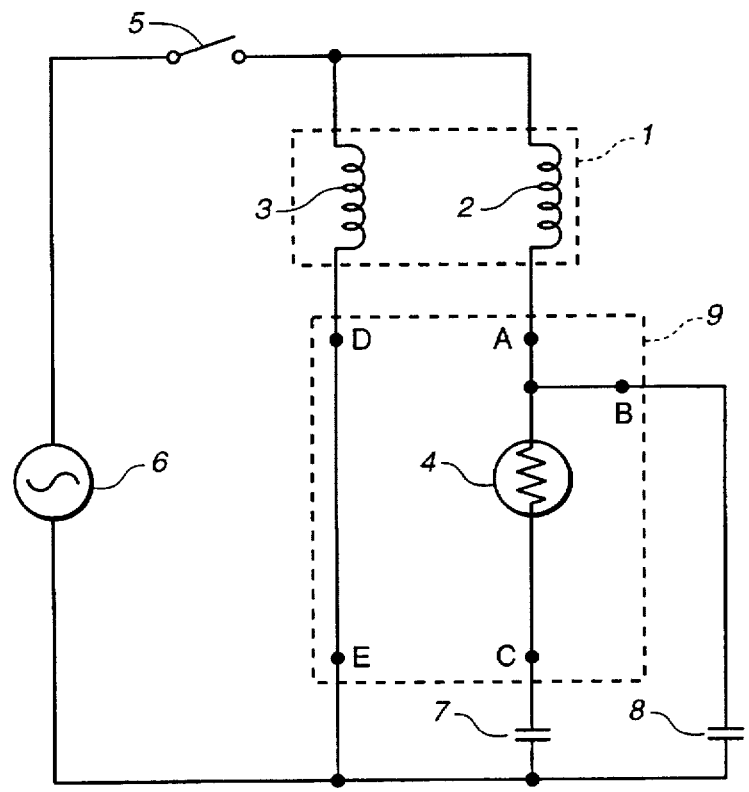
FIG._5
*(PRIOR ART)*
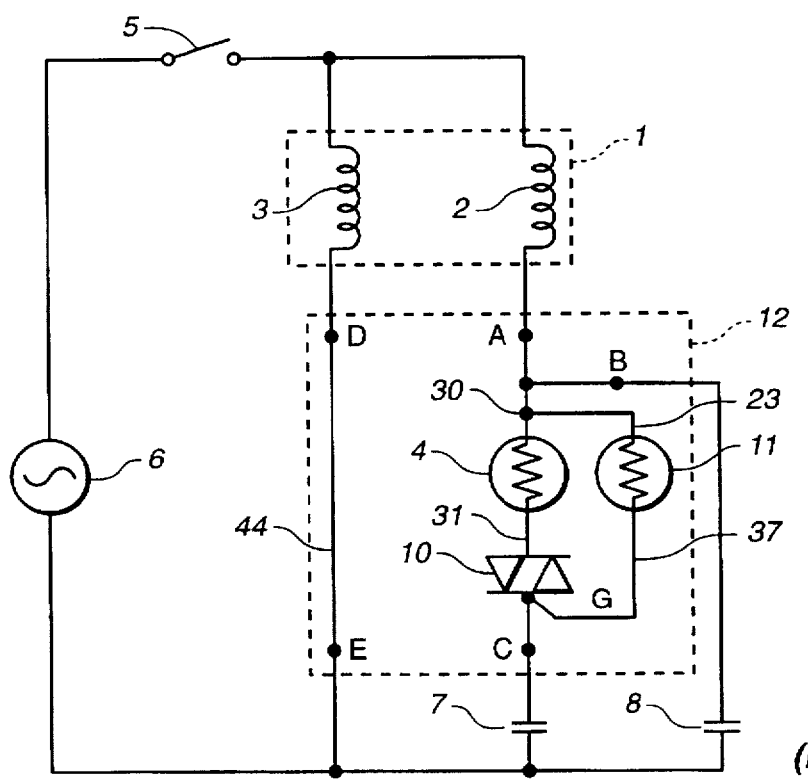
FIG._6
*(PRIOR ART)*

COMPONENT FOR MOTOR START UP CIRCUIT

BACKGROUND OF THE INVENTION

This invention relates to a component for a motor start-up circuit and more particularly to such a component capable of shutting off the start-up current for a motor.

FIG. 5 shows a prior art driver circuit for a motor 1, such as a single-phase induction motor used for a compressor of a refrigerator. Such a motor has an auxiliary coil 2 adapted to function at the time of its start-up and a main coil 3 for carrying out its steady state operation. The motor start-up circuit incorporated in such a motor-driving circuit includes a thermistor with positive temperature characteristic (PTC) for start-up ("the start-up thermistor 4") connected in series with the auxiliary coil 2, and a power source 6 is connected to the motor 1 through a switch 5. If the switch 5 is closed to connect the power source 6 to the motor 1, a relatively strong current flows through the PTC thermistor 4 to the auxiliary coil 2 during an early stage of the start-up of the motor 1. After the start-up of the motor 1 has been completed, the PTC thermistor 4 serves to reduce the current to the auxiliary coil 2 by increasing its resistance by the heat generated by itself.

A capacitor 7 for the start-up ("the start-up capacitor") is connected to the PTC thermistor 4 in series, and another capacitor 8 for the operation of the motor 1 ("operation capacitor") is connected in parallel with this series connection of the start-up capacitor 7 and the PTC thermistor 4. When the motor 1 is a single-phase induction motor, the start-up capacitor 7 serves to shift the phase by 90° in order to increase the start-up torque given by the auxiliary coil 2. The operation capacitor 8 serves to prevent pulsation after the start-up of the motor 1 so as to improve the rotary efficiency. In some situations, either or both of these capacitors may be dispensed with.

The portion surrounded by broken line in FIG. 5, including the PTC thermistor 4 and indicated by numeral 9, is commercially available as a motor start-up component, having a case (not shown) for containing the PTC thermistor 4 and other components therein. Since a current continues to flow through the PTC thermistor 4 even after the motor 1 has been started up, as explained above, and heat continues to be generated thereby, the PTC thermistor 4 is sandwiched between spring-like elastic terminals inside the case so as to be separated from the inner wall surface of the case such that heat emission does not take place too much and the waste in power by this motor start-up component 9 will be reduced. In FIG. 5, letters A, B, C, D and E indicate terminals for connecting the component 9 externally.

In a motor start-up circuit of this kind, the resistance of the PTC thermistor 4 does not increase infinitely. This means that an unwanted current keeps flowing to the auxiliary coil 2 through the PTC thermistor 4 even after the motor 1 has been started up, thereby wasting several watts of power. Heat emission from the PTC thermistor 4 also continues.

FIG. 6 shows, using the same numerals as in FIG. 5 to indicate equivalent components without repetitiously explaining what they are, another motor-driving circuit incorporating another motor start-up circuit as described in Japanese Patent Publication Tokkai 6-339291, characterized as connecting not only a start-up PTC thermistor 4 but also a Triac switch 10 (hereinafter referred to simply as a "triac") in series with the auxiliary coil 2. Another PTC thermistor for controlling the triac 10 ("the triac-controlling PTC thermistor 11") is provided, connected in parallel with the start-up PTC thermistor 4, and one of the terminals of this triac-controlling PTC thermistor 11 is connected to the gate G of the triac 10.

When power from the source 6 is supplied to the motor 1 at the time of its start-up, a trigger signal is applied to the gate G of the triac 10 through the triac-controlling PTC thermistor 11, putting the triac 10 in the current-passing condition and allowing a motor start-up current to flow to the auxiliary coil 2 through the start-up PTC thermistor 4. A certain period of time after the start-up of the motor 1, the resistance of the start-up PTC thermistor 4 increases due to the heat generated by itself and the current through the auxiliary coil 2 is thereby reduced. At the same time, the resistance of the triac-controlling thermistor 11 also increases due to its own heat emission, thereby reducing the current to the gate G of the triac 10 to switch it off.

A very small current will thereafter continue to flow through the triac-controlling PTC thermistor 11. Since the thermal capacity of the triac-controlling thermistor 11 can be made much smaller than that of the start-up PTC thermistor 4, however, the power required to keep it at a high-temperature, high-resistance condition is much smaller than that in the case of the circuit shown in FIG. 5.

The portion of the circuit shown in FIG. 6, surrounded by a broken line and indicated by numeral 12, may also be unitized as a motor start-up component, including the start-up and triac-controlling PTC thermistors 4 and 11 and the triac 10, as well as five terminals A, B, C, D and E for external connection.

The start-up current for the motor 1, however, must be kept above a certain level until the start-up is completed. The time until the intensity of the current drops to one-half of the rush current is referred to as the operating time of the start-up current. If the volume of the start-up PTC thermistor 4 is reduced, it can heat up more quickly and its operating time becomes shorter. Thus, start-up PTC thermistors with different volumes are used for different kinds of motors. In other words, a start-up PTC thermistor with a larger volume is required for a motor requiring a longer operating time.

After the motor 1 of FIG. 6 is started, the current to the start-up PTC thermistor 4 is shut off. After the switch 5 is opened to discontinue the supply of power to the motor 1, the motor 1 can be switched on again if enough time has passed since the current to the start-up PTC thermistor 4 was shut off. If the component 12 is being used for a motor of the compressor for a refrigerator, for example, and if the refrigerator door is opened immediately after the thermostat has switched off the motor because the inner temperature of the refrigerator has dropped, it may become necessary to restart the motor immediately after it is stopped. As another example, if the motor 1 is stopped by a momentary power failure, there may be situations wherein the motor 1 cannot be restarted because the temperature of the start-up PTC thermistor 4 has not dropped quickly enough. Thus, the motor 1 must be designed by taking such situations into consideration.

Although not shown, the component 12 in FIG. 6 usually requires a metallic heat radiator or the like in order to prevent the triac 10 from overheating, but this causes the total number of parts to increase, adversely affecting the production cost.

In the case of the circuit shown in FIG. 5, its volume need not necessarily be increased to make its operating time longer because this can be accomplished by increasing the heat-up time of its start-up PTC thermistor 4. This, in turn, can be accomplished by increasing the temperature (herein referred to as "the resistance-doubling temperature") at which the resistance becomes twice that at 25° C., improving the heat radiation from the start-up PTC thermistor 4, or a combination of the both above.

If the aforementioned resistance-doubling temperature is increased, the heat-emitting temperature becomes too high at the time of stabilized operation, and heat resistance of terminal parts near the start-up PTC thermistor 4 and the case must be taken into consideration. This, however, cannot be easily accomplished. As long as a resin case is used, the resistance-doubling temperature cannot be raised by more than a few °C., and this cannot be expected to be sufficiently effective. In order to improve the heat radiation from the start-up PTC thermistor 4, on the other hand, terminal parts will have to be made with a material with improved thermal conductivity such as copper or the shape may be so chosen as to increase the contact area with the start-up PTC thermistor 4. In this situation, too, the material for the case must be selected such that it can withstand the rise in the temperature of these terminal parts.

These attempts to improve the dispersion of heat from the start-up PTC thermistor 4 is contrary to the earlier described attempt to support the start-up PTC thermistor 4 inside the case but away from its inner walls by sandwiching it with elastic spring-like terminal parts so as to limit the transfer of heat, resulting in an increase in the waste of power. The waste in power increases also if the temperature at the time of stabilized operation is increased.

SUMMARY OF THE INVENTION

It is therefore an object of this invention to provide an improved start-up component with which the above problems can be solved.

This invention relates to a motor start-up component of a start-up circuit incorporated in a motor-driving circuit including an auxiliary coil which functions at the time of the start-up of the motor and a main coil for the steady state operation of the motor. A component according to this invention, with which the above and other objects can be accomplished, may be characterized as comprising a start-up thermistor with positive temperature characteristic and a Triac switch to be connected in series with the auxiliary coil, a case containing both the start-up thermistor and the Triac switch, and a connector member having a planar contact portion, one of its principal surfaces contacting an electrode of the start-up thermistor and the other of the principal surfaces contacting the inner wall surface of the case. The case may further contain therein a triac-controlling circuit element connected to the gate of the Triac switch for controlling the Triac switch. According to a preferred embodiment of the invention, this triac-controlling circuit is formed by another thermistor with positive temperature characteristic which is connected in parallel with the start-up thermistor. The case is preferably provided with partition walls which separate individual spaces for containing the start-up thermistor, the Triac switch and the triac-controlling circuit element.

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIG. 1 is a diagonal view taken from a downward direction of a motor start-up component embodying this invention;

FIG. 2 is a plan view of the component of FIG. 1 with a top part of its case removed to show its interior;

FIG. 3 is an exploded diagonal view of the inner parts shown in FIG. 2;

FIG. 4 is a portion of FIG. 3 which is enlarged for more clearly showing how the Triac switch is assembled;

FIG. 5 is a diagram of a motor-driving circuit incorporating a prior art start-up circuit; and FIG. 6 is a diagram of a prior art motor-driving circuit which can incorporate a component according to this invention shown in FIG. 1.

Throughout herein, those components which are substantially the same or at least similar to each other are indicated by the same numerals although they are parts of different devices and may not be repetitiously described.

DETAILED DESCRIPTION OF THE INVENTION

FIGS. 1–4 are referenced to describe a motor start-up component 12 embodying this invention which may be incorporated in a circuit shown in FIG. 6. As shown in FIG. 1, the component 12 has a case 13, formed with a bottom half body 14 and a top half body 15, and contains a start-up PTC thermistor 4, a triac 10 and a triac-controlling PTC thermistor 11. There are also provided (first, second and third) terminal members 16, 17 and 18. One end of each of these terminal members 16, 17 and 18 is inside the case 13 but the other end protrudes outside for connection as shown in FIG. 1. The inside ends of the first and third terminal members 16 and 18 can also be connected to the exterior through openings (not shown) through the top half body 15 of the case. As shown in FIGS. 2 and 4, partition walls are provided inside the case 13 for providing separate spaces for containing the thermistors 4 and 11, the triac 10, and the terminal members 16, 17 and 18. These partition walls will be described more in detail below.

Nearly at the center of the bottom half body 14 of the case 13 is a partition wall 19 extending in a U-shape when seen from above. Partition walls 20 and 21, each L-shaped when seen from above, are provided at two mutually adjacent corners of the bottom half body 14 of the case 13. The triac 10 is contained in the space surround by the U-shaped partition wall 19, and the start-up PTC thermistor 4 is contained in the space outside the U-shaped partition wall 19 between the U-shaped partition wall 19 and the inner surface 22 of the bottom half body 14 of the case 13. The triac-controlling PTC thermistor 11 is contained in the space outside the U-shaped partition wall 19 on the side opposite from the start-up PTC thermistor 4. The first terminal member 16 is disposed on the opposite side of the L-shaped partition wall 20 from the triac-controlling PTC thermistor 11. The third terminal member 18 is on the opposite side of the other L-shaped partition wall 21 from the triac-controlling PTC thermistor 11. The second terminal member 17 is disposed opposite the U-shaped partition wall 19. Thus, the triac 10 is disposed between the start-up PTC thermistor 4 and the triac-controlling PTC thermistor 11, and the triac-controlling PTC thermistor 11 is disposed between the first and third terminal members 16 and 18.

The partition walls 19, 20 and 21 serve not only to make the positioning of the various electrical elements easier but to make it difficult for the heat generated by the triac 10 and the triac-controlling PTC thermistor 11 to be transmitted to the start-up PTC thermistor 4 by the air movement such that the cooling of the start-up PTC thermistor 4 will not be prevented. The partition walls 19, 20 and 21 also serve to inhibit the air movement inside the case 13, preventing pollutant-containing air from entering and thereby adversely affecting the reliability of the electrical elements inside. In order to prevent entry of air from outside, the gaps between the partition walls 19 and 20 and between the partition walls 19 and 21 should preferably be eliminated.

As shown in FIG. 6, the start-up PTC thermistor 4 and the triac-controlling PTC thermistor 11 are connected by a line 23. This line 23 is represented by a connector member 24 having a planar contact portion 25, one of the principal surfaces of which being contacting one of the electrodes (indicated by numeral 26) of the start-up PTC thermistor 4 and the other principal surface contacting the inner wall 22 of the case 13.

With the component thus structured, the start-up PTC thermistor 4 can be made to heat up more slowly, and the operating time can be made longer by over 10% than if a thermistor with the same volume and the same resistance-doubling temperature is supported from both sides by spring-like elastic contact pieces as described above. As a result, the volume of the start-up PTC thermistor 4 can be made smaller proportionately, and the component 12 as a whole can be made more compact. The operating time can be further increased if the resistance-doubling temperature of the start-up PTC thermistor 4 is made higher within the limit of the resistance of the case 13 against heat. Moreover, the heat of the start-up PTC thermistor 4 can be more efficiently dispersed, and the return time (the minimum length of time after the current to the start-up PTC thermistor 4 is shut off when the motor 1 can be restarted) can be made shorter.

Since the current to the start-up PTC thermistor 4 is shut off after a specified length of time, furthermore, the case 13 may be made of any material with heat resistance over 150° C. This expands the choice of material available for the case. From the point of view of heat resistance, this invention makes it possible to obtain components with improved reliability. Thermosetting resins such as phenol resins and melamine resins as well as thermoplastic resins such as polyphenylene sulfide, polyethylene terephthalate and polyamides can be used. The case 13 may be so designed that only its planar contact portion 25 be made of a material with high thermal resistance.

The connector member 24, as shown in FIG. 3, includes an elongated part 27 including a portion which extends perpendicularly to the planar contact portion 25 and another portion which further bends perpendicularly therefrom. A pair of spring-like elastic contact pieces 28 is formed at one end (away from the planar contact portion 25) of the elongated part 27. The elongated part 27 of the connector member 24 extends along two mutually adjacent side surfaces of the bottom half body 14 of the case 13, and the spring-like elastic contact pieces 28 serve to elastically contact one of the electrodes (29) of the triac-controlling PTC thermistor 11.

This is how the connector member 24 serves as the line 23 shown in FIG. 6 and is connected to the first terminal member 16. In other words, the first terminal member 16 is connected to the joint, shown at 30 in FIG. 6, between the start-up PTC thermistor 4 and the triac-controlling PTC thermistor 11 and also serves as the terminals A and B as well as the connecting line therebetween.

The line connecting the start-up PTC thermistor 4 and the triac 10, indicated by numeral 31 in FIG. 6, is represented by another connector member 32 shown in FIG. 3. This connector member 32 is provided with two spring-like elastic contact pieces 33 and is positioned along an external side surface of the partition wall 19 such that these contact pieces 33 will elastically contact the other electrode of the start-up PTC thermistor 4. The connector member 32 is further provided with an L-shaped member 35 for connecting to a terminal 36 of the triac 10 above the upper surface of the partition wall 19.

The line connecting the gate G of the triac 10 and the triac-controlling PTC thermistor 11, indicated by numeral 37 in FIG. 6, is represented in FIG. 3 by still another connector member 38 which is provided with two spring-like elastic contact pieces 39 and is positioned along another external side surface of the partition wall 19 such that these contact pieces 39 will elastically contact the other electrode 40 of the triac-controlling PTC thermistor 11. This connector member 38, too, has an upwardly protruding L-shaped member 41 which serves to contact the gate G of the triac 10 above the upper surface of the partition wall 19.

The second terminal member 17 serves to represent the terminal C shown in FIG. 6 and is connected to a terminal 42 of the triac 10 on the same side as the gate G. The second terminal member 17 is provided with a strip 43 for making this contact. This strip 43 is connected to the terminal 42 of the triac 10 above the upper surface of the partition wall 19.

The third terminal member 18 serves to represent the line indicated in FIG. 6 by numeral 44 which is not connected to any of the other electrical elements of the component 12 but merely penetrates it. The third terminal member 18 corresponds to the terminals D and E of FIG. 6 and the line connecting them together.

As shown in FIG. 4, the triac 10 is disposed within a space surrounded by the U-shaped partition wall 19. The bottom half body 14 of the case 13 is provided with an indentation 46 for accepting a heat-radiating part 45 of the triac 10 while contacting it. Since this heat-radiating part 45 is thus practically buried inside the wall of the bottom half body 14, the rise in the temperature of the triac 10 can be effectively prevented without providing any metallic heat-radiating plate, and reliability of the triac 10 can thus be improved.

It is to be noted that both the contact member 32 on the side of the start-up PTC thermistor 4 closer to the triac 10 and the contact member 38 on the side of the triac-controlling PTC thermistor 11 closer to the triac 10 contact the start-up PTC thermistor 4 and the triac-controlling PTC thermistor 11, respectively, through the contact pieces 33 or 39 having only limited contact areas. Thus, the heat from the triac-controlling PTC thermistor 11 and the start-up PTC thermistor 4 is not easily transmitted to the triac 10. This also serves to prevent the rise of temperature of the triac 10 and to improve the reliability of the triac 10.

The top half body 15 engages with the bottom half body 14 to unitize the case 13. In order to keep the two half bodies 14 and 15 in this engaged relationship, a plurality of deformable hooks 47 are provided as shown in FIG. 2 to the bottom half body for engaging with undercut parts (not shown) provided on an inner wall section of the top half body 15.

The component 12 thus formed is incorporated into a motor-driving circuit such that the electrical connections as shown in FIG. 6 can be achieved. This is done, for example, by connecting the first terminal member 16 to the auxiliary coil 2 of the motor 1 and the operation capacitor 8, the second terminal member 17 to the start-up capacitor 7 and the third terminal member 18 to the main coil 3 of the motor 1 and one of the terminals of the source 6.

If the switch 5 is closed after the connections as described above are completed, a gate current flows to the gate G of the triac 10 through the triac-controlling PTC thermistor 11. Since the triac-controlling PTC thermistor 11 is at a normal temperature and its resistance is small during the start-up of the single-phase induction motor 1, the gate current is sufficiently large to switch on the triac 10. As a result, the triac is triggered for each half cycle, causing a start-up current to flow to the auxiliary coil 2 through the start-up PTC thermistor 4. After a certain period of time within which the motor 1 has started up, the start-up PTC thermistor 4 is heated up and reduces the current to the auxiliary coil 2. In the meantime, the triac-controlling PTC thermistor 11 is also heated up and the gate current becomes very weak such that the triac 10 is no longer switched on. Since no current is passed to the start-up PTC thermistor 4 any longer, there is no waste in power, and the start-up PTC thermistor 4 is cooled, its temperature going down to the normal level.

A very weak current will continue to flow through the triac-controlling PTC thermistor 11 thereafter but, since the triac-controlling PTC thermistor 11 has normally less than one fifth of the volume of the start-up PTC thermistor 4, the waste of power thereby can be reduced to less than one fifth. The return time within which the motor 1 can be restarted is also significantly reduced.

What is claimed is:

1. A component for a start-up circuit incorporated in a motor-driving circuit having an auxiliary coil which operates during a start-up period and a main coil for stead-state operation by said motor-driving circuit; said component comprising:
   a start-up thermistor with positive temperature characteristic and a Triac switch to be connected in series with said auxiliary coil;
   a case containing said start-up thermistor and said Triac switch; and
   a connector member having a planar contact portion with principal surfaces, one of said principal surfaces contacting one of electrodes of said start-up thermistor and the other of said principal surfaces contacting an inner wall surface of said case.

2. The component of claim 1 further comprising a triac-controlling circuit element which is connected to a gate of said Triac switch and serves to control said Triac switch, said case further containing said triac-controlling circuit element.

3. The component of claim 2 wherein said triac-controlling circuit element includes a triac-controlling thermistor with positive temperature characteristic which is connected in parallel with said start-up thermistor, one of terminals of said triac-controlling thermistor being connected to said gate of said Triac switch.

4. The component of claim 3 wherein said case has partition walls which separate spaces individually containing said start-up thermistor, said Triac switch and said triac-controlling circuit element.

5. The component of claim 4 wherein said Triac switch includes a heat-radiating part and said case has an indentation capable of receiving said heat-radiating part therein while contacting said heat-radiating part.

6. The component of claim 4 wherein at least a portion of said case at which said case contacts said planar contact portion of said connector member comprises a material with heat resistance greater than 150° C.

7. The component of claim 3 wherein said Triac switch includes a heat-radiating part and said case has an indentation capable of receiving said heat-radiating part therein while contacting said heat-radiating part.

8. The component of claim 3 wherein said Triac switch is disposed between said start-up thermistor and said triac-controlling thermistor.

9. The component of claim 8 further comprising:
   a first terminal member connected to a junction between said start-up thermistor and said triac-controlling thermistor;
   a second terminal member connected to the other terminal of said Triac switch on the same side of said Triac switch as said gate; and
   a third terminal member provided to be connected to said main coil when said start-up circuit is incorporated in said motor-driving circuit, said case containing at least a portion each of said first, second and third terminal members such that said first, second and third terminal members can be connected to the exterior at both ends thereof.

10. The component of claim 9 wherein said triac-controlling thermistor is disposed between said first and third terminal members.

11. The component of claim 3 further comprising:
   a first terminal member connected to a junction between said start-up thermistor and said triac-controlling thermistor;
   a second terminal member connected to the other terminal of said Triac switch on the same side of said Triac switch as said gate; and
   a third terminal member provided to be connected to said main coil when said start-up circuit is incorporated in said motor-driving circuit, said case containing said first, second and third terminal members such that said first, second and third terminal members can be connected to the exterior at both ends thereof.

12. The component of claim 11 wherein said triac-controlling thermistor is disposed between said first and third terminal members.

13. The component of claim 3 wherein at least a portion of said case at which said case contacts said planar contact portion of said connector member comprises a material with heat resistance greater than 150° C.

14. The component of claim 2 wherein said case has partition walls which separate spaces individually containing said start-up thermistor, said Triac switch and said triac-controlling circuit element.

15. The component of claim 14 wherein said Triac switch includes a heat-radiating part and said case has an indentation capable of receiving said heat-radiating part therein while contacting said heat-radiating part.

16. The component of claim 14 wherein at least a portion of said case at which said case contacts said planar contact portion of said connector member comprises a material with heat resistance greater than 150° C.

17. The component of claim 2 wherein said Triac switch includes a heat-radiating part and said case has an indentation capable of receiving said heat-radiating part therein while contacting said heat-radiating part.

18. The component of claim 2 wherein at least a portion of said case at which said case contacts said planar contact portion of said connector member comprises a material with heat resistance greater than 150° C.

19. The component of claim 1 wherein said Triac switch includes a heat-radiating part and said case has an indentation capable of receiving said heat-radiating part therein while contacting said heat-radiating part.

20. The component of claim 1 wherein at least a portion of said case at which said case contacts said planar contact portion of said connector member comprises a material with heat resistance greater than 150° C.

* * * * *